United States Patent
Xu

(10) Patent No.: US 8,683,814 B2
(45) Date of Patent: Apr. 1, 2014

(54) GAS TURBINE ENGINE COMPONENT WITH IMPINGEMENT AND LOBED COOLING HOLE

(75) Inventor: JinQuan Xu, Groton, CT (US)

(73) Assignee: United Technologies Corporation, Hartford, CT (US)

( * ) Notice: Subject to any disclaimer, the term of this patent is extended or adjusted under 35 U.S.C. 154(b) by 0 days.

(21) Appl. No.: 13/544,257

(22) Filed: Jul. 9, 2012

(65) Prior Publication Data

US 2013/0205794 A1 Aug. 15, 2013

Related U.S. Application Data

(60) Provisional application No. 61/599,315, filed on Feb. 15, 2012.

(51) Int. Cl.
*F02C 7/12* (2006.01)

(52) U.S. Cl.
USPC ............................................ 60/806; 415/115

(58) Field of Classification Search
USPC ................... 60/752–760, 806; 415/115–116; 416/96 R, 97 R
See application file for complete search history.

(56) References Cited

U.S. PATENT DOCUMENTS

| | | |
|---|---|---|
| 4,153,386 A | 5/1979 | Leogrande et al. |
| 4,197,443 A | 4/1980 | Sidenstick |
| 4,529,358 A | 7/1985 | Papell |
| 4,622,821 A | 11/1986 | Madden |
| 4,653,279 A | 3/1987 | Reynolds |
| 4,653,983 A | 3/1987 | Vehr |
| 4,672,727 A | 6/1987 | Field |
| 4,684,323 A | 8/1987 | Field |
| 4,700,544 A | 10/1987 | Fucci |
| 4,738,588 A | 4/1988 | Field |
| 5,062,768 A | 11/1991 | Marriage |
| 5,096,379 A | 3/1992 | Stroud et al. |
| 5,129,231 A | 7/1992 | Becker et al. |
| 5,252,026 A | 10/1993 | Shepherd |
| 5,326,224 A | 7/1994 | Lee et al. |
| 5,358,374 A | 10/1994 | Correia et al. |
| 5,382,133 A | 1/1995 | Moore et al. |

(Continued)

FOREIGN PATENT DOCUMENTS

| | | |
|---|---|---|
| EP | 1326007 A2 | 7/2003 |
| EP | 1609949 A1 | 12/2005 |

OTHER PUBLICATIONS

The PCT International Search Report mailed May 29, 2013 for the International Application No. PCT/US2013/026040.

(Continued)

*Primary Examiner* — Phutthiwat Wongwian
(74) *Attorney, Agent, or Firm* — Kinney & Lange, P.A.

(57) ABSTRACT

A gas turbine engine component includes a gas path wall having a first and second opposing surfaces and a baffle positioned along the gas path wall. The baffle has impingement holes for directing cooling fluid onto the first surface of the gas path wall. A cooling hole is formed in the gas path wall and extends from a metering section having an inlet in the first surface through a transition to a diffusing section having an outlet in the second surface. A longitudinal ridge extends along the cooling hole between the transition and the outlet. The longitudinal ridge divides the diffusing section of the cooling hole into first and second lobes.

20 Claims, 11 Drawing Sheets

(56) References Cited

U.S. PATENT DOCUMENTS

| | | | |
|---|---|---|---|
| 5,418,345 | A | 5/1995 | Adamski |
| 5,419,681 | A | 5/1995 | Lee |
| 5,609,779 | A | 3/1997 | Crow et al. |
| 5,651,662 | A | 7/1997 | Lee et al. |
| 5,660,525 | A | 8/1997 | Lee et al. |
| 5,683,600 | A | 11/1997 | Kelley et al. |
| 5,813,836 | A | 9/1998 | Starkweather |
| 6,139,258 | A | 10/2000 | Lang, III et al. |
| 6,183,199 | B1 | 2/2001 | Beeck et al. |
| 6,241,468 | B1 | 6/2001 | Lock et al. |
| 6,243,948 | B1 | 6/2001 | Lee et al. |
| 6,287,075 | B1 | 9/2001 | Kercher |
| 6,307,175 | B1 | 10/2001 | Blochlinger et al. |
| 6,494,678 | B1 | 12/2002 | Bunker |
| 6,547,524 | B2 | 4/2003 | Kohli et al. |
| 6,572,335 | B2 | 6/2003 | Kuwabara et al. |
| 6,744,010 | B1 | 6/2004 | Pepe et al. |
| 6,944,580 | B1 | 9/2005 | Blume et al. |
| 6,973,419 | B1 | 12/2005 | Fortin et al. |
| 6,979,176 | B2 | 12/2005 | Nakamata et al. |
| 7,186,085 | B2 | 3/2007 | Lee |
| 7,273,351 | B2 | 9/2007 | Kopmels |
| 7,328,580 | B2 | 2/2008 | Lee et al. |
| 7,374,401 | B2 | 5/2008 | Lee |
| 7,578,653 | B2 | 8/2009 | Klasing et al. |
| 7,726,131 | B2 | 6/2010 | Sze et al. |
| 7,766,609 | B1 | 8/2010 | Liang |
| 7,887,294 | B1 | 2/2011 | Liang |
| 7,997,868 | B1 | 8/2011 | Liang |
| 8,038,399 | B1 | 10/2011 | Liang |
| 8,057,181 | B1 | 11/2011 | Liang |
| 8,079,812 | B2 * | 12/2011 | Okita .......... 416/97 R |
| 8,245,519 | B1 * | 8/2012 | Liang .......... 60/806 |
| 2001/0036401 | A1 | 11/2001 | Harvey et al. |
| 2002/0159888 | A1 | 10/2002 | Rinck et al. |
| 2005/0106020 | A1 | 5/2005 | Bunker et al. |
| 2008/0003096 | A1 | 1/2008 | Kohli et al. |
| 2008/0145208 | A1 | 6/2008 | Klasing et al. |
| 2009/0013695 | A1 | 1/2009 | Dierberger et al. |
| 2009/0074575 | A1 | 3/2009 | Propheter-Hinckley et al. |
| 2009/0304499 | A1 | 12/2009 | Strock et al. |
| 2010/0068032 | A1 | 3/2010 | Liang |
| 2010/0068068 | A1 | 3/2010 | Liang |
| 2010/0282721 | A1 | 11/2010 | Bunker et al. |
| 2011/0097191 | A1 | 4/2011 | Bunker |
| 2011/0185572 | A1 | 8/2011 | Wei et al. |
| 2011/0293423 | A1 | 12/2011 | Bunker et al. |
| 2012/0051941 | A1 | 3/2012 | Bunker |
| 2012/0167389 | A1 | 7/2012 | Lacy et al. |
| 2013/0115103 | A1 * | 5/2013 | Dutta et al. .......... 416/97 R |

OTHER PUBLICATIONS

Kusterer, K. et al. "The Nekomimi Cooling Technology: Cooling Holes with Ears for High-Efficient Film Cooling" Proceedings of ASME Turbo Expo 2011, Jun. 6-10, 2011. 11 pages.

* cited by examiner

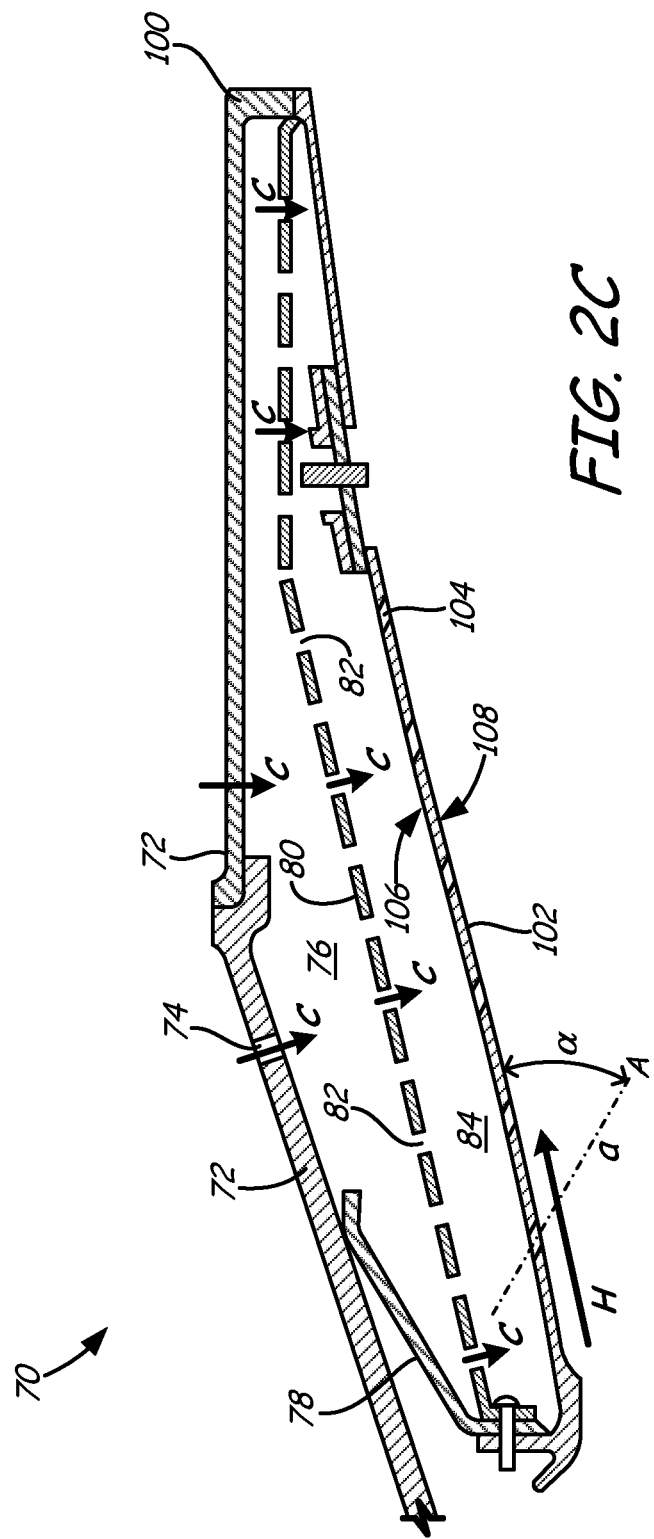

GAS TURBINE ENGINE COMPONENT WITH IMPINGEMENT AND LOBED COOLING HOLE

CROSS REFERENCE TO RELATED APPLICATION

This application claims priority to U.S. Provisional Application No. 61/599,315, filed on Feb. 15, 2012, and entitled "Gas Turbine Engine Component with Impingement and Lobed Cooling Hole," the disclosure of which is incorporated by reference in its entirety.

BACKGROUND

This invention relates generally to turbomachinery, and specifically to turbine flow path components for gas turbine engines. In particular, the invention relates to cooling techniques for airfoils and other gas turbine engine components exposed to hot working fluid flow, including, but not limited to, rotor blades and stator vane airfoils, endwall surfaces including platforms, shrouds and compressor and turbine casings, combustor liners, turbine exhaust assemblies, thrust augmentors and exhaust nozzles.

Gas turbine engines are rotary-type combustion turbine engines built around a power core made up of a compressor, combustor and turbine, arranged in flow series with an upstream inlet and downstream exhaust. The compressor section compresses air from the inlet, which is mixed with fuel in the combustor and ignited to generate hot combustion gas. The turbine section extracts energy from the expanding combustion gas, and drives the compressor section via a common shaft. Expanded combustion products are exhausted downstream, and energy is delivered in the form of rotational energy in the shaft, reactive thrust from the exhaust, or both.

Gas turbine engines provide efficient, reliable power for a wide range of applications in aviation, transportation and industrial power generation. Small-scale gas turbine engines typically utilize a one-spool design, with co-rotating compressor and turbine sections. Larger-scale combustion turbines including jet engines and industrial gas turbines (IGTs) are generally arranged into a number of coaxially nested spools. The spools operate at different pressures, temperatures and spool speeds, and may rotate in different directions.

Individual compressor and turbine sections in each spool may also be subdivided into a number of stages, formed of alternating rows of rotor blade and stator vane airfoils. The airfoils are shaped to turn, accelerate and compress the working fluid flow, or to generate lift for conversion to rotational energy in the turbine.

Industrial gas turbines often utilize complex nested spool configurations, and deliver power via an output shaft coupled to an electrical generator or other load, typically using an external gearbox. In combined cycle gas turbines (CCGTs), a steam turbine or other secondary system is used to extract additional energy from the exhaust, improving thermodynamic efficiency. Gas turbine engines are also used in marine and land-based applications, including naval vessels, trains and armored vehicles, and in smaller-scale applications such as auxiliary power units.

Aviation applications include turbojet, turbofan, turboprop and turboshaft engine designs. In turbojet engines, thrust is generated primarily from the exhaust. Modern fixed-wing aircraft generally employ turbofan and turboprop configurations, in which the low pressure spool is coupled to a propulsion fan or propeller. Turboshaft engines are employed on rotary-wing aircraft, including helicopters, typically using a reduction gearbox to control blade speed. Unducted (open rotor) turbofans and ducted propeller engines also known, in a variety of single-rotor and contra-rotating designs with both forward and aft mounting configurations.

Aviation turbines generally utilize two and three-spool configurations, with a corresponding number of coaxially rotating turbine and compressor sections. In two-spool designs, the high pressure turbine drives a high pressure compressor, forming the high pressure spool or high spool. The low-pressure turbine drives the low spool and fan section, or a shaft for a rotor or propeller. In three-spool engines, there is also an intermediate pressure spool. Aviation turbines are also used to power auxiliary devices including electrical generators, hydraulic pumps and elements of the environmental control system, for example using bleed air from the compressor or via an accessory gearbox.

Additional turbine engine applications and turbine engine types include intercooled, regenerated or recuperated and variable cycle gas turbine engines, and combinations thereof. In particular, these applications include intercooled turbine engines, for example with a relatively higher pressure ratio, regenerated or recuperated gas turbine engines, for example with a relatively lower pressure ratio or for smaller-scale applications, and variable cycle gas turbine engines, for example for operation under a range of flight conditions including subsonic, transonic and supersonic speeds. Combined intercooled and regenerated/recuperated engines are also known, in a variety of spool configurations with traditional and variable cycle modes of operation.

Turbofan engines are commonly divided into high and low bypass configurations. High bypass turbofans generate thrust primarily from the fan, which accelerates airflow through a bypass duct oriented around the engine core. This design is common on commercial aircraft and transports, where noise and fuel efficiency are primary concerns. The fan rotor may also operate as a first stage compressor, or as a pre-compressor stage for the low-pressure compressor or booster module. Variable-area nozzle surfaces can also be deployed to regulate the bypass pressure and improve fan performance, for example during takeoff and landing. Advanced turbofan engines may also utilize a geared fan drive mechanism to provide greater speed control, reducing noise and increasing engine efficiency, or to increase or decrease specific thrust.

Low bypass turbofans produce proportionally more thrust from the exhaust flow, generating greater specific thrust for use in high-performance applications including supersonic jet aircraft. Low bypass turbofan engines may also include variable-area exhaust nozzles and afterburner or augmentor assemblies for flow regulation and short-term thrust enhancement. Specialized high-speed applications include continuously afterburning engines and hybrid turbojet/ramjet configurations.

Across these applications, turbine performance depends on the balance between higher pressure ratios and core gas path temperatures, which tend to increase efficiency, and the related effects on service life and reliability due to increased stress and wear. This balance is particularly relevant to gas turbine engine components in the hot sections of the compressor, combustor, turbine and exhaust sections, where active cooling is required to prevent damage due to high gas path temperatures and pressures.

SUMMARY

This invention concerns a gas turbine engine component including a gas path wall having a first and second opposing surfaces and a baffle positioned along the gas path wall. The baffle has impingement holes for directing cooling fluid onto the first surface of the gas path wall. A cooling hole is formed in the gas path wall and extends from a metering section having an inlet in the first surface through a transition to a diffusing section having an outlet in the second surface. A longitudinal ridge extends along the cooling hole between the transition and the outlet. The longitudinal ridge divides the diffusing section of the cooling hole into first and second lobes.

Another embodiment of the present invention is a liner assembly for a gas turbine engine. The liner assembly includes an impingement baffle having impingement holes and a liner wall having a first surface extending along the impingement baffle and a second surface extending opposite the first surface. A cooling hole is formed in the liner wall. The cooling hole includes a metering section having an inlet in the first surface, a diffusing section having an outlet in the second surface, and a transition between the metering section and the diffusing section. A longitudinal ridge extends between the transition and the outlet. The longitudinal ridge divides the diffusing section of the cooling hole into first and second lobes.

BRIEF DESCRIPTION OF THE DRAWINGS

FIG. 2C is a cross-sectional view of an impingement film and film cooling assembly for the gas turbine engine.

DETAILED DESCRIPTION

Figure 1:
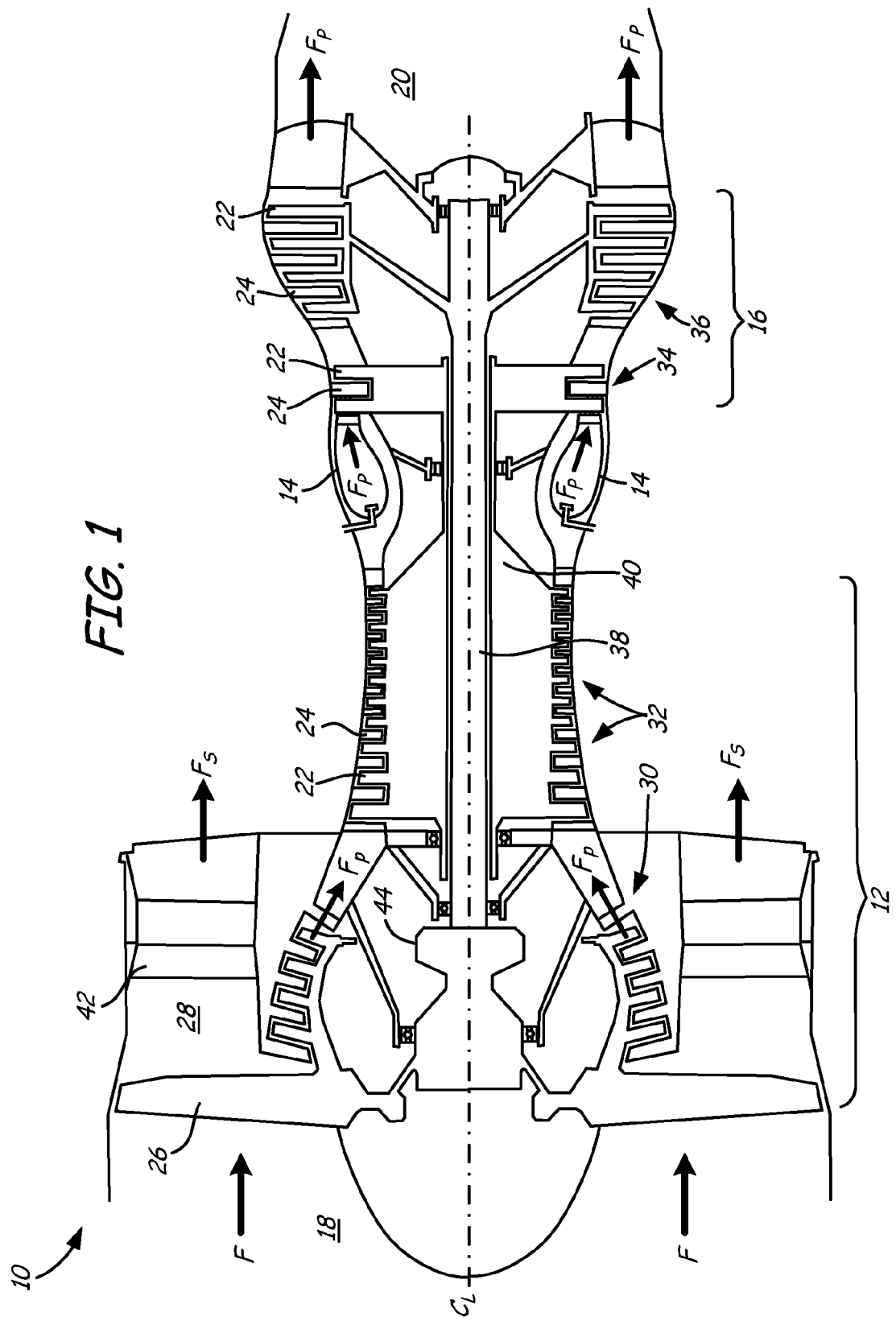
FIG. 1 is a cross-sectional view of a gas turbine engine.

FIG. 1 is a cross-sectional view of gas turbine engine 10. Gas turbine engine (or turbine engine) 10 includes a power core with compressor section 12, combustor 14 and turbine section 16 arranged in flow series between upstream inlet 18 and downstream exhaust 20. Compressor section 12 and turbine section 16 are arranged into a number of alternating stages of rotor airfoils (or blades) 22 and stator airfoils (or vanes) 24.

In the turbofan configuration of FIG. 1, propulsion fan 26 is positioned in bypass duct 28, which is coaxially oriented about the engine core along centerline (or turbine axis) $C_L$. An open-rotor propulsion stage 26 may also provided, with turbine engine 10 operating as a turboprop or unducted turbofan engine. Alternatively, fan rotor 26 and bypass duct 28 may be absent, with turbine engine 10 configured as a turbojet or turboshaft engine, or an industrial gas turbine.

For improved service life and reliability, components of gas turbine engine 10 are provided with an improved cooling configuration, as described below. Suitable components for the cooling configuration include rotor airfoils 22, stator airfoils 24 and other gas turbine engine components exposed to hot gas flow, including, but not limited to, platforms, shrouds, casings and other endwall surfaces in hot sections of compressor 12 and turbine 16, and liners, nozzles, afterburners, augmentors and other gas wall components in combustor 14 and exhaust section 20.

In the two-spool, high bypass configuration of FIG. 1, compressor section 12 includes low pressure compressor (LPC) 30 and high pressure compressor (HPC) 32, and turbine section 16 includes high pressure turbine (HPT) 34 and low pressure turbine (LPT) 36. Low pressure compressor 30 is rotationally coupled to low pressure turbine 36 via low pressure (LP) shaft 38, forming the LP spool or low spool. High pressure compressor 32 is rotationally coupled to high pressure turbine 34 via high pressure (HP) shaft 40, forming the HP spool or high spool.

Flow F at inlet 18 divides into primary (core) flow $F_P$ and secondary (bypass) flow $F_S$ downstream of fan rotor 26. Fan rotor 26 accelerates secondary flow $F_S$ through bypass duct 28, with fan exit guide vanes (FEGVs) 42 to reduce swirl and improve thrust performance. In some designs, structural guide vanes (SGVs) 42 are used, providing combined flow turning and load bearing capabilities.

Primary flow $F_P$ is compressed in low pressure compressor 30 and high pressure compressor 32, then mixed with fuel in combustor 14 and ignited to generate hot combustion gas. The combustion gas expands to provide rotational energy in high pressure turbine 34 and low pressure turbine 36, driving high pressure compressor 32 and low pressure compressor 30, respectively. Expanded combustion gases exit through exhaust section (or exhaust nozzle) 20, which can be shaped or actuated to regulate the exhaust flow and improve thrust performance.

Low pressure shaft 38 and high pressure shaft 40 are mounted coaxially about centerline $C_L$, and rotate at different speeds. Fan rotor (or other propulsion stage) 26 is rotationally coupled to low pressure shaft 38. In advanced designs, fan drive gear system 44 is provided for additional fan speed control, improving thrust performance and efficiency with reduced noise output.

Fan rotor 26 may also function as a first-stage compressor for gas turbine engine 10, and LPC 30 may be configured as an intermediate compressor or booster. Alternatively, propulsion stage 26 has an open rotor design, or is absent, as described above. Gas turbine engine 10 thus encompasses a wide range of different shaft, spool and turbine engine configurations, including one, two and three-spool turboprop and (high or low bypass) turbofan engines, turboshaft engines, turbojet engines, and multi-spool industrial gas turbines.

In each of these applications, turbine efficiency and performance depend on the overall pressure ratio, defined by the total pressure at inlet 18 as compared to the exit pressure of compressor section 12, for example at the outlet of high pressure compressor 32, entering combustor 14. Higher pressure ratios, however, also result in greater gas path temperatures, increasing the cooling loads on rotor airfoils 22, stator airfoils 24 and other components of gas turbine engine 10. To reduce operating temperatures, increase service life and maintain engine efficiency, these components are provided with improved cooling configurations, as described below.

Suitable components include, but are not limited to, cooled gas turbine engine components in compressor sections 30 and 32, combustor 14, turbine sections 34 and 36, and exhaust section 20 of gas turbine engine 10.

Figure 2A:
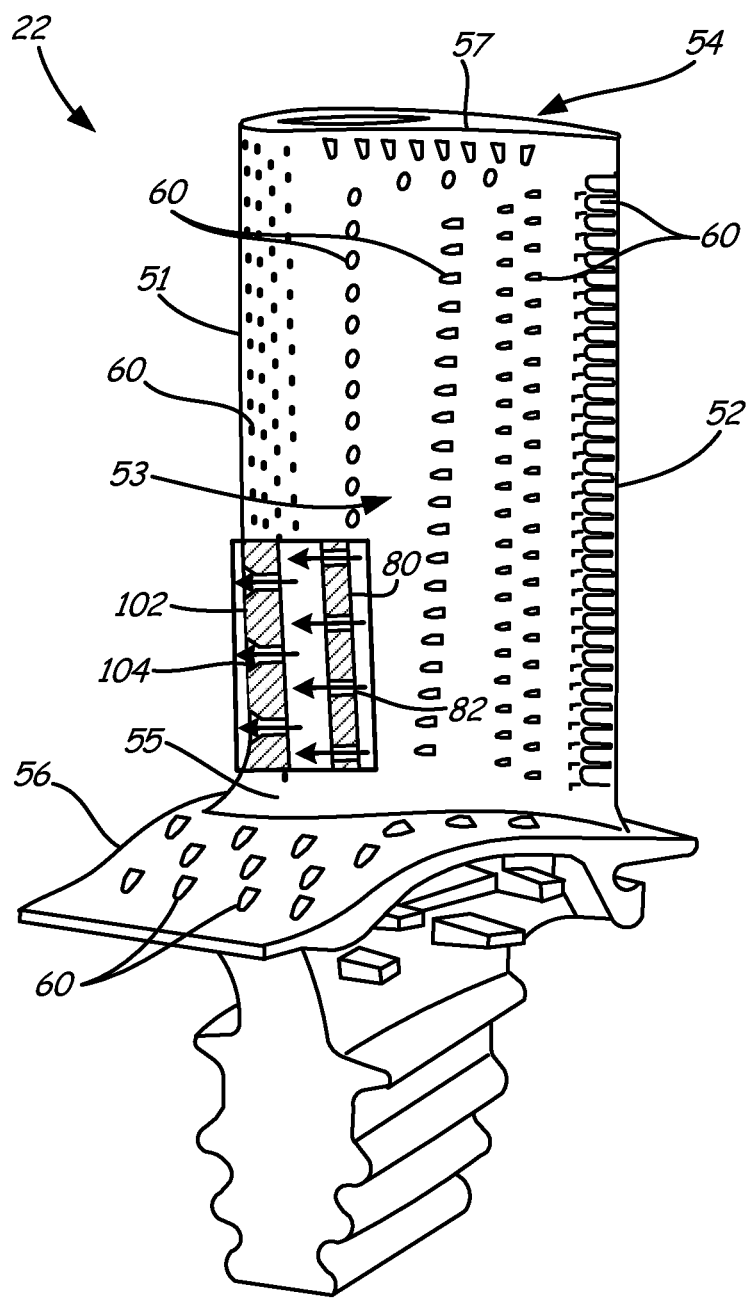
FIG. 2A is a perspective view of an airfoil for the gas turbine engine, in a rotor blade configuration.

FIG. 2A is a perspective view of rotor airfoil (or blade) 22 for gas turbine engine 10, as shown in FIG. 1, or for another turbomachine. Rotor airfoil 22 extends axially from leading edge 51 to trailing edge 52, defining pressure surface 53 (front) and suction surface 54 (back) therebetween.

Pressure and suction surfaces 53 and 54 form the major opposing surfaces or walls of airfoil 22, extending axially between leading edge 51 and trailing edge 52, and radially from root section 55, adjacent inner diameter (ID) platform 56, to tip section 57, opposite ID platform 56. In some designs, tip section 57 is shrouded.

Cooling holes or outlets 60 are provided on one or more surfaces of airfoil 22, for example along leading edge 51, trailing edge 52, pressure (or concave) surface 53, or suction (or convex) surface 54, or a combination thereof. Cooling holes or passages 60 may also be provided on the endwall surfaces of airfoil 22, for example along ID platform 56, or on a shroud or engine casing adjacent tip section 57.

In addition, FIG. 2A also shows impingement baffle 80 (also called float wall or splash plate) in cutaway view, with impingement holes 82, as described below with respect to FIG. 2C, for impingement cooling of the inner surface of the hot gas wall of turbine engine component 22. The inset image is not to scale. Here, film cooling holes 60 are formed as cooling holes 104 in the hot gas path wall formed by any one of leading edge 51, trailing edge 52, pressure surface 53, suction surface 54 or platform surface 56. Impingement baffle 80 can also be utilized with other inner and outer hot gas path walls 102 and surfaces 106 and 108 of other turbine components, including, but not limited to, combustors, turbine exhaust assemblies, nozzle components, turbine blades, blade outer air seals, and stator airfoil 24 of FIG. 2B.

Figure 2B:
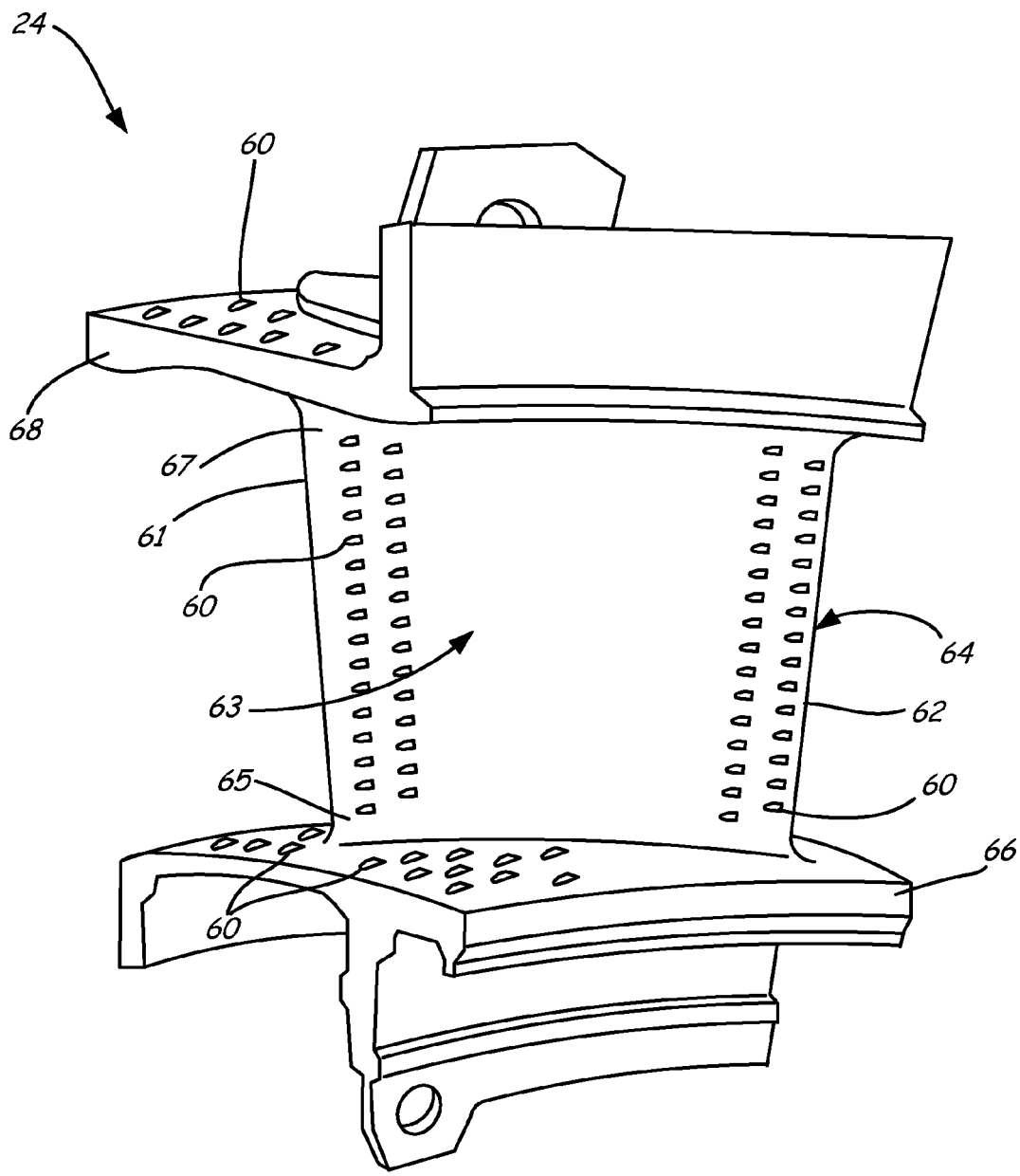
FIG. 2B is a perspective view of an airfoil for the gas turbine engine, in a stator vane configuration.

FIG. 2B is a perspective view of stator airfoil 24 for gas turbine engine 10, as shown in FIG. 1, or for another turbomachine. Stator airfoil 24 extends axially from leading edge 61 to trailing edge 62, defining pressure surface 63 (front) and suction surface 64 (back) therebetween. Pressure and suction surfaces 63 and 64 extend from inner (or root) section 65, adjacent ID platform 66, to outer (or tip) section 67, adjacent outer diameter (OD) platform 68.

Cooling holes or outlets 60 are provided along one or more surfaces of airfoil 24, for example leading or trailing edge 61 or 62, pressure (concave) or suction (convex) surface 63 or 64, or a combination thereof. Cooling holes or passages 60 may also be provided on the endwall surfaces of airfoil 24, for example along ID platform 66 and OD platform 68.

Rotor airfoils 22 (FIG. 2A) and stator airfoils 24 (FIG. 2B) are formed of high strength, heat resistant materials such as high temperature alloys and superalloys, and are provided with thermal and erosion-resistant coatings. Airfoils 22 and 24 are also provided with internal cooling passages and cooling holes 60 to reduce thermal fatigue and wear, and to prevent melting when exposed to hot gas flow in the higher temperature regions of a gas turbine engine or other turbomachine. Cooling holes 60 deliver cooling fluid (e.g., steam or air from a compressor) through the outer walls and platform structures of airfoils 22 and 24, creating a thin layer (or film) of cooling fluid to protect the outer (gas path) surfaces from high temperature flow.

While surface cooling extends service life and increases reliability, injecting cooling fluid into the gas path also reduces engine efficiency, and the cost in efficiency increases with the required cooling flow. Cooling holes 60 are thus provided with improved metering and inlet geometry to reduce jets and blow off, and improved diffusion and exit geometry to reduce flow separation and corner effects. Cooling holes 60 reduce flow requirements and improve the spread of cooling fluid across the hot surfaces of airfoils 22 and 24, and other gas turbine engine components, so that less flow is needed for cooling and efficiency is maintained or increased.

FIG. 2C is a cross-sectional view of impingement and film cooling assembly 70. Assembly 70 includes outer case 72 with cooling fluid apertures 74 for directing cooling fluid flow C into cooling fluid plenum 76, with seal 78 and float impingement baffle 80 having impingement holes 82 for impingement cooling of turbine component 100 along gas gas path wall 102.

As shown in FIG. 2C, gas path wall 102 extends along impingement baffle 80, across impingement plenum 84. First surface 106 of gas path wall 102 is exposed to impingement flow of cooling fluid C from cooling fluid plenum 76, through impingement holes 82 in impingement baffle 80. Second surface 108 extends opposite first surface 106, and is exposed to hot gas flow H, for example combustion gas or exhaust gas. Cooling holes 104 extend from impingement plenum 84 at first surface 106 through gas path wall 102 to second surface 108.

Cooling fluid C is supplied to cooling plenum 76 via cooling holes 74 in an outer turbine case or other plenum boundary 72. Cooling fluid C from cooling plenum 76 is supplied to impingement plenum 84 via impingement holes 82 in impingement baffle 80, where impingement holes 82 are sized to produce jets of cooling fluid flow C impinging onto first surface 106 of gas path wall 102.

Typically, impingement holes 82 are pointed at first surface 106 of gas path wall 102 between cooling holes 104. Depending on application, the spacing between baffle wall (impingement plenum) 84 and gas path wall 102 may be equal to or less than about three times the inlet diameter of cooling holes 104.

Cooling holes 104 extend through gas path wall 102 from first (relatively cool) surface 106 to second (relatively hot) surface 108. Axis A is an approximate longitudinal axis of flow of cooling holes 104. Axis A is inclined in a downstream sense at angle $\alpha$ with respect to the direction of hot gas flow H, in order to encourage attached flow along second surface 108 of gas path wall 102. In some embodiments, cooling holes 104 also have a circumferential component, in order to encourage tangential film flow.

The example of FIG. 2C is merely representative, and varies from application to application. For example, cooling assembly 70 may be configured for use with a turbine exhaust assembly or similar gas turbine engine component 100 in low pressure turbine 36 or exhaust section 20 of gas turbine engine 10, as shown in FIG. 1, or with a combustor liner assembly or similar gas turbine engine component 100 for combustor 14. Alternatively, cooling assembly 70 may be configured for use with a cooled turbine liner or casing component 100 in high pressure turbine 34 or low pressure turbine 36, a hot section compressor liner or casing component 100 for high pressure compressor 32, or an exhaust nozzle liner or augmentor component 100 for exhaust section 20.

In airfoil applications, cooling assembly 70 is configured for use with rotor airfoil 22, stator airfoil 24 or other airfoil component 100, with cooling hole 104 forming cooling hole 60 in a pressure surface, suction surface or platform surface, as shown in FIGS. 2A and 2B. Impingement baffle 80 extends within airfoil component 100, adjacent first surface 106 of gas path wall 102, where first surface 106 is an inner surface of the airfoil, and second surface 108 is an outer surface exposed to hot working fluid flow.

The components of cooling assembly 70 are typically manufactured from durable heat-resistant materials such as high-temperature metal alloys or superalloys, in order to protect from hot gas flow H. In addition, thermal barrier coatings and other protective coatings may be used, as described above for airfoils 22 and 24. To further improve service life and reliability, cooling holes 104 are configured with improved metering and diffusive flow geometries, as described below.

Figure 3A:
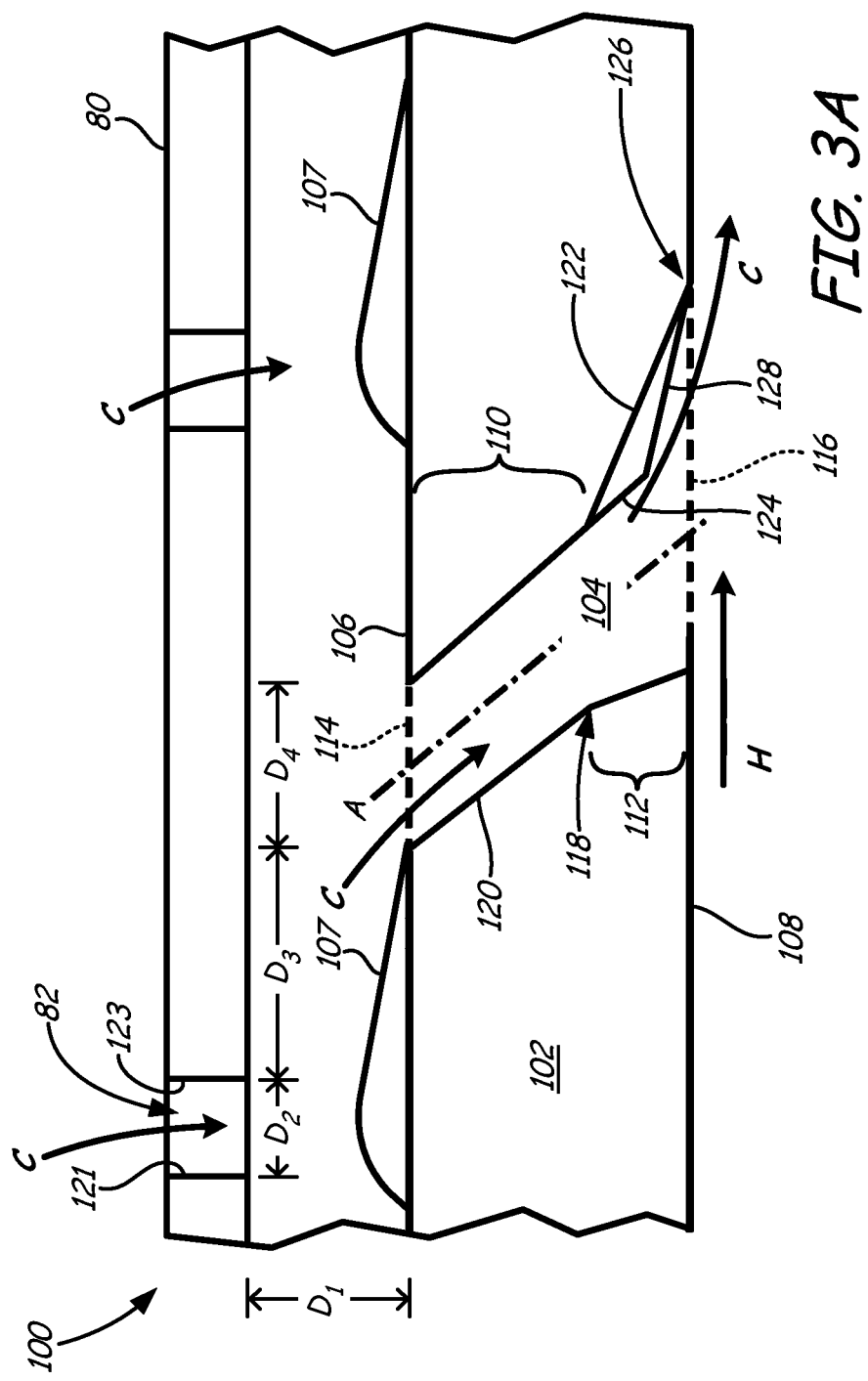
FIG. 3A is a cross-sectional view of a gas path wall for the cooling assembly, taken in a longitudinal direction.

FIG. 3A is a cross-sectional view of gas turbine engine component (turbine or turbomachinery component) 100 with gas path wall 102, taken in a longitudinal direction and that carries a cool first surface 106 and an opposite, hot second surface 108. Cooling hole 104 extends through gas path wall 102 from first surface 106 to second surface 108. FIG. 3A also shows impingement baffle 80 with impingement holes 82, forming an impingement and film cooling assembly 70, as described above (see also FIGS. 3B, 3C, below).

Cooling fluid C flows through impingement hole 82 to first surface 106 to provide impingement cooling on first surface 106. Cooling fluid C then flows along first surface 106 to and through cooling hole 104. In the illustrated embodiment, first surface 106 includes bump 107 substantially aligned with impingement hole 82 such that cooling fluid c flowing through impingement hole 82 flows over bump 107. Bump 107 is a structure with a convex surface extending from first surface 106 toward impingement baffle 80. Bump 107 can increase heat transfer surface area of a portion of first surface 106 exposed to impingement cooling from impingement hole 82 as cooling fluid C flows over bump 107. Bump 107 can have an aerodynamic shape that has a relatively steep slope in a longitudinally upstream direction and a relatively gradual slope in a longitudinally downstream direction toward inlet 114 of cooling hole 104. In an alternative embodiment, bump 107 can have a shape other than as illustrated, such as a hemisphere. In further alternative embodiments, bump 107 can be omitted.

Gas path wall 102 of component 100 is exposed to cooling fluid C on first surface 106, with longitudinal hot gas flow H along second surface 108. In some components, for example airfoils, first surface 106 is an inner surface and second surface 108 is an outer surface. In other components, for example combustor liners and exhaust assemblies, first surface 106 is an outer surface, and second surface 108 is an inner surface. More generally, the terms inner and outer are merely representative, and may be interchanged.

Metering section 110 of cooling hole 104 extends from inlet 114 at first surface 106 of gas path wall 102 to transition 118. Diffusing section 112 extends from transition 118 to outlet 116 at second surface 108. Transition 118 is defined between metering section 110 and diffusing section 112, including any region of overlap.

Cooling hole 104 delivers cooling fluid C from first surface 106 of wall 102 to second surface 108, for example to provide diffusive flow and film cooling. Cooling hole 104 is inclined along axis A in a downstream direction with respect to hot gas flow H, in order to improve cooling fluid coverage over second surface 108, with less separation and reduced flow mixing.

Impingement baffle 80 is spaced from first surface 106 of gas path wall 102 by distance $D_1$. Impingement hole 82 has a distance $D_2$ from its upstream surface 121 to its downstream surface 123. Cooling hole 104 has a distance $D_4$ from its upstream surface 120 to its downstream surface 122 at inlet 114. Distance $D_3$ is a distance in a longitudinal direction from downstream surface 123 of impingement hole 82 to upstream surface 120 of cooling hole 104. In one embodiment, distance $D_1$ can be less than or equal to four times distance $D_2$. Distance $D_3$ can be equal to between one times distance $D_2$ and ten times distance $D_2$. These relationships can provide for relatively effective film cooling of first surface 106. In embodiments where impingement hole 82 is substantially cylindrical and inlet 114 is substantially circular, distance $D_2$ can be equal to, less than, or greater than distance $D_4$. In embodiments where impingement hole 82 is not cylindrical and/or inlet 114 is not circular, a flow area of impingement hole 82 can be equal to, less than, or greater than a flow area of inlet 114.

In alternative embodiments, impingement hole 82 need not be cylindrical. For example, impingement hole 82 could be an elongated slot. In that embodiment, there can be a substantially greater number of cooling holes 104 than impingement holes 82. Alternatively, impingement holes 82 could be micro-holes through impingement baffle 80, with a quantity that is substantially greater than that of cooling hole 104.

As shown in FIG. 3A, metering section 110 of cooling hole 104 has substantially constant or decreasing cross-sectional area between inlet 114 and transition 118, with upstream and downstream surfaces 120 and 122 converging or extending generally parallel to one another along axis A. This maintains or decreases the longitudinal dimension (along hot gas flow H) of cooling hole 104 from inlet 114 through metering section 110 to transition 118, in order to regulate the cooling fluid flow from inlet 114.

Diffusing section 112 of cooling hole 104 diverges between transition 118 and outlet 116. That is, upstream and downstream surfaces 120 and 122 diverge from one another and away from axis A in the longitudinal direction, in the region from transition 118 through diffusing section 112 to outlet 116. This increases the cross sectional flow area of diffusing section 112, in order to provide diffusive flow between transition 118 and outlet 116.

Transition 118 is defined in the region between metering section 110 and diffusing section 112, where cooling hole 104 becomes divergent (increasing flow area), and where the cooling fluid flow becomes diffusive. Transition 118 may be relatively abrupt, or may encompass an extended region or section of cooling hole 104, for example in a flow transition region between metering section 110 and diffusing section 112, or over a region of overlap between metering section 110 and diffusing section 112.

Longitudinal ridge 124 projects out (toward axis A) from downstream surface 122 of cooling hole 104, discouraging vortex flow and dividing cooling hole 104 into lobes along diffusing section 112, in order to reduce swirl and mixing at outlet 116. In some designs, longitudinal ridge 124 extends along transition region 128 to trailing edge 126 of outlet 116, in order to discourage detachment and improve flow uniformity along second surface 108 of gas path wall 102, downstream of cooling hole 104 at outlet 116 (see also, e.g., FIGS. 4A, 4B, 5A, 5B). In some embodiments, transition region 128 can be flat or planar. Alternatively, transition region 128 can be non-flat and non-planar, such as curved (e.g. convex) longitudinally and/or laterally.

Figure 3B:
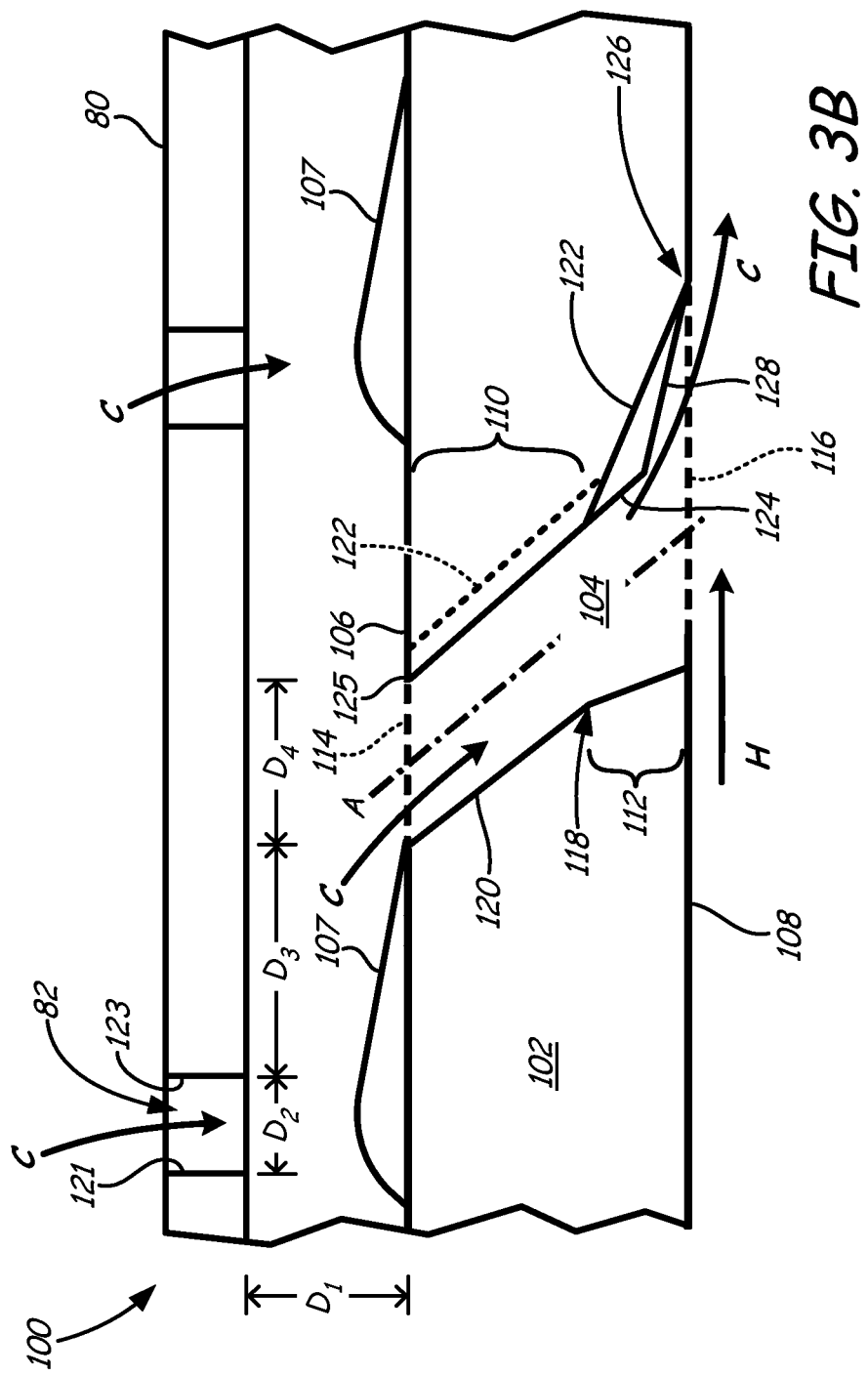
FIG. 3B is a cross-sectional view of the gas path wall, showing the outlet portion of the cooling hole with a ridge configuration.

FIG. 3B is a cross-sectional view of gas turbine engine component 100 with gas path wall 102, showing cooling hole 104 with longitudinal ridge 124. In this design, longitudinal ridge 124 extends through transition 118 and along metering section 110 to cusp 125 on inlet 114.

Cusp 125 co-extends with ridge 124, from inlet 114 and along metering section 110 to transition 118. Like longitudinal ridge 124, cusp 125 extends outward (toward axis A) from downstream surface 122 of cooling hole 104, discouraging lateral flow components to reduce swirl in metering section 110.

Figure 3C:
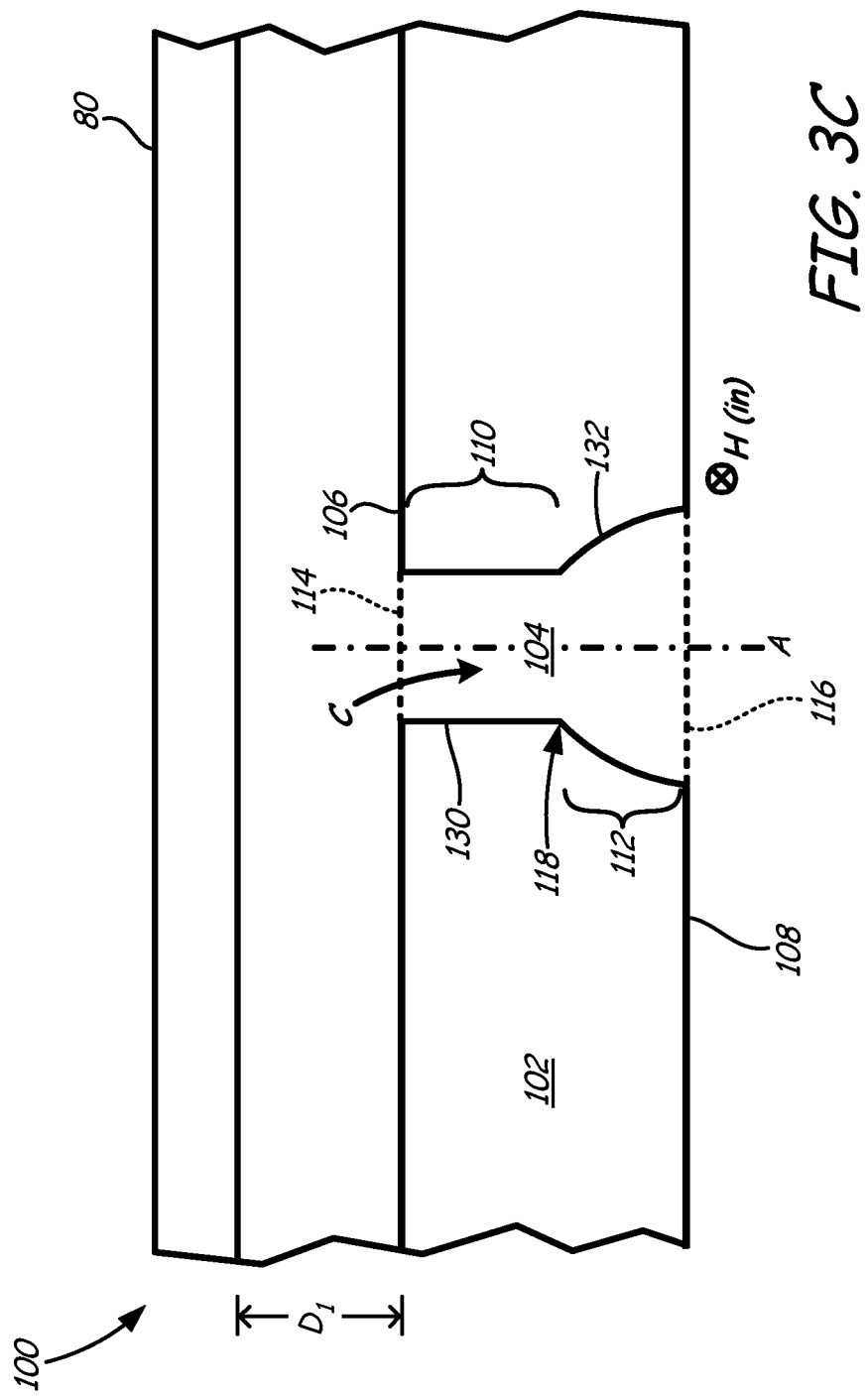
FIG. 3C is a cross-sectional view of the gas path wall, taken in a transverse direction.

FIG. 3C is a transverse cross sectional view of gas path wall 102, taken along axis A and looking in a downstream direction, in a plane perpendicular or transverse to the longitudinal cross sections of FIGS. 3A and 3B. In this downstream view, hot gas flow H is directed into the page, and lateral side surfaces 130 and 132 are separated in the transverse direction across axis A, perpendicular to hot gas flow H.

As shown in the FIG. 3C, first and second side surfaces 130 and 132 of cooling hole 104 are substantially parallel along axis A in metering section 110 between inlet 114 and transition 118. Alternatively, side surfaces 130 and 132 converge toward one another through metering section 110, so that the flow area of cooling hole 104 decreases or remains constant (i.e., does not increase) between inlet 114 and transition 118.

Thus, metering section 110 restricts flow from inlet 114 through transition 118, reducing the flow rate and improving efficiency by providing only the desired level of cooling fluid flow to diffusing section 112. This metering design provides more efficient cooling flow from outlet 116, with greater coverage along second surface 108 of gas path wall 102.

In diffusing section 112, side surfaces 130 and 132 diverge laterally from one another (and from axis A) between transition 118 and outlet 116. Thus, diffusing section 112 is divergent both in the longitudinal direction as shown in FIGS. 3A and 3B, and in the transverse direction as shown in FIG. 3C. This configuration improves diffusive flow between transition 118 and outlet 116, discouraging flow separation at trailing edge 126 and improving cooling performance along second surface 108 of gas path wall 102.

The cross-sectional geometry of cooling hole 104 varies, as described above, and as shown in the figures. Moreover, the design of cooling hole 104 is not limited to these particular examples, but also encompasses different combinations and variations of the features that are described, including different metering sections 110 with parallel or converging surfaces 120, 122, 130 and 132, different diffusing sections 112 with diverging surfaces 120, 122, 130 and 132, and different transitions 118 as defined between metering section 110 and diffusing section 112.

Figure 3D:
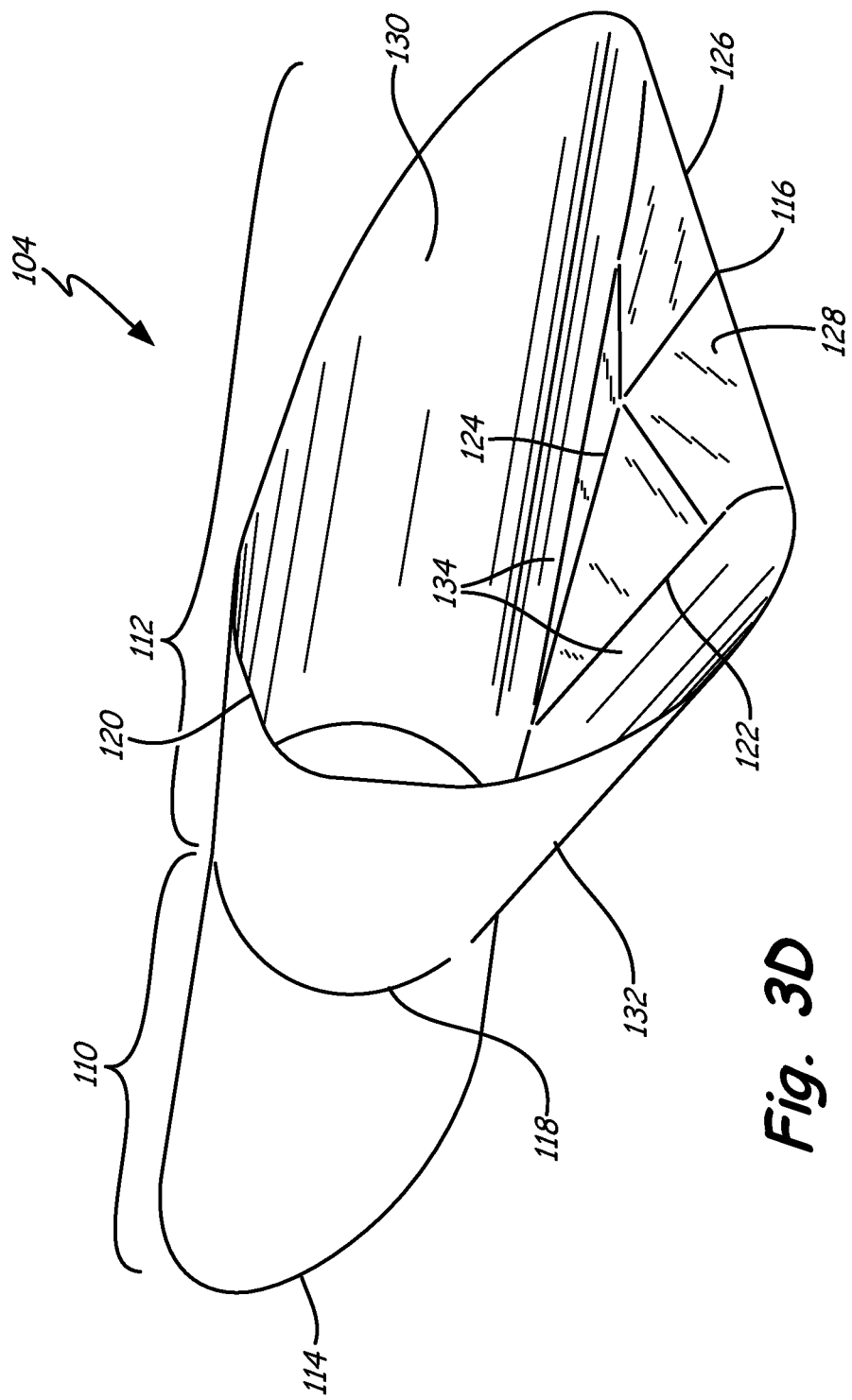
FIG. 3D is a perspective view one embodiment of a cooling hole.

FIG. 3D is a perspective view one embodiment of cooling hole 104, showing only the surfaces that define cooling hole 104 (with gas path wall 102 omitted for clarity). FIG. 3D illustrates surfaces 120, 122, 130 and 132 being substantially parallel at metering section 110, and surfaces 120, 122, 130 and 132 substantially diverging at diffusing section 112. Longitudinal ridge 124 extends along cooling hole 104 between transition 118 and outlet 116, dividing cooling hole 104 into two lobes 134 along diffusing section 112.

Figure 4A:
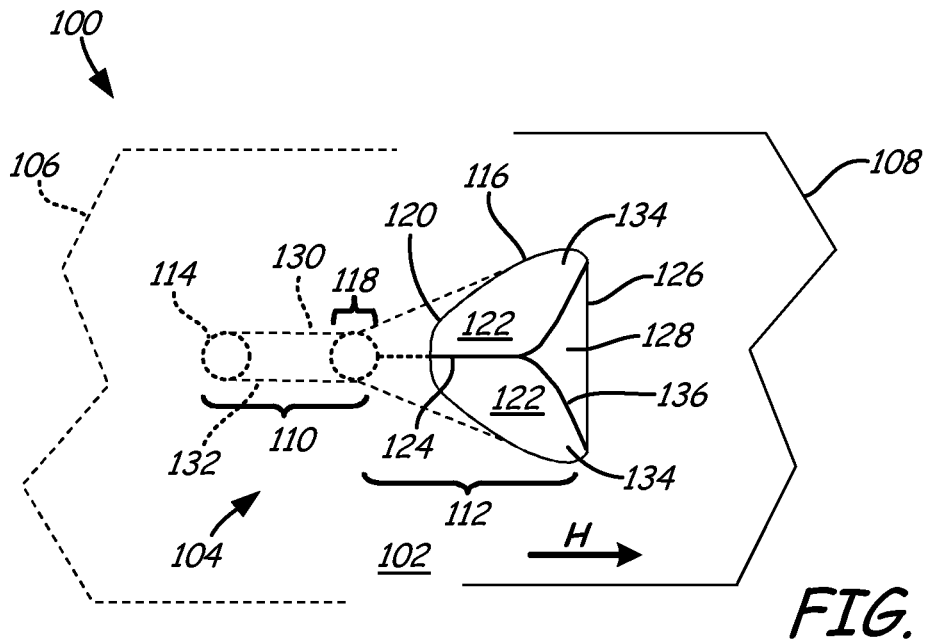
FIG. 4A is a schematic view of the gas path wall, illustrating a lobed cooling hole geometry in the outlet region.

FIG. 4A is a schematic view of gas path wall 102, illustrating a lobed configuration for cooling hole 104 in diffusing section 112. In this particular example, one longitudinal ridge 124 extends along cooling hole 104 between transition 118 and outlet 116, dividing cooling hole 104 into two lobes 134 along diffusing section 112. Lobes 134 are surfaces of wall 102 which define distinct channel-like portions of the void of cooling hole 104.

Diffusing section 112 of cooling hole 104 diverges (widens) in a lateral direction and/or in a longitudinal direction, as described above. This configuration promotes diffusive flow through cooling hole 104, from transition 118 through diffusing section 112 to outlet 116, for more uniform coverage with less detachment along second surface 108 of gas path wall 102.

The configuration of outlet 116 is also selected to improve cooling performance. In the particular configuration of FIG. 4A, for example, outlet 116 is formed as a delta, with arcuate upstream surface 120 intersecting second surface 108 of gas path wall 102 and extending to substantially linear or straight trailing edge 126, transverse or perpendicular to hot gas flow H in order to reduce separation along second surface 108 of gas path wall 102.

Transition region 128 extends laterally between arcuate extensions 136 from longitudinal ridges 124, where arcuate extensions 136 are defined along boundaries with adjacent lobes 134. As shown in FIG. 4A, for example, longitudinal ridge 124 splits or bifurcates into two arcuate extensions 136, which extend longitudinally and transversely along diffusing section 112 to trailing edge 126 of outlet 116. In this particular configuration, cooling hole 104 thus has a single transition region 128, extending along substantially the entire length of trailing edge 126 of outlet 116.

Figure 4B:
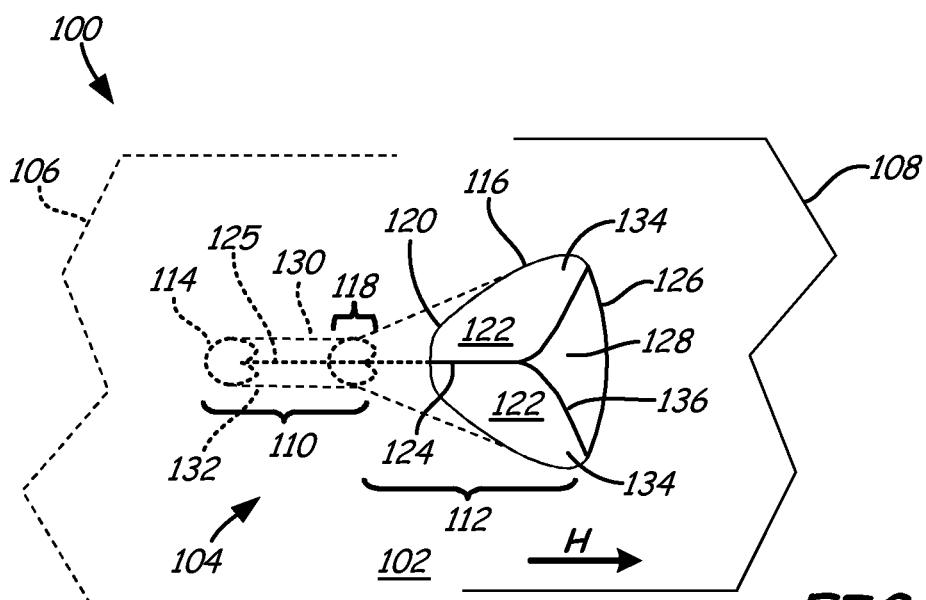
FIG. 4B is a schematic view of the gas path wall, illustrating a cusped cooling hole geometry in the inlet region.

FIG. 4B is a schematic view of gas path wall 102, illustrating a cusped configuration for cooling hole 104 in metering section 110. In this configuration, longitudinal ridge 124 extends through transition 118 and along metering section 110 to cusp 125 on inlet 114. Outlet 116 has a general delta convex configuration, intersecting second surface 108 of gas path wall 102 at arcuate upstream surface 120, and extending downstream to convex trailing edge 126.

The size, length and other geometric properties of cusp 125 are selected to discourage swirl (vortex) flow in cooling hole 104 or near second surface 108, for example by introducing a canceling vortex pair into the cooling fluid to weaken kidney-shaped vortices formed at outlet 116.

Lobes 134 can have arcuate or curved surfaces along downstream surface 122 of diffusing section 112, forming longitudinal ridge 124 as a cusped ridge or rib structure similar to cusp 125. As shown in FIG. 4B, moreover, longitudinal ridge 124 and cusp 125 may be congruently formed as extensions of one another, with ridge 124 and cusp 125 having similar geometry along downstream surface 122 of cooling hole 104. Alternatively, longitudinal ridge 124 may extend independently of cusp 125, for example from an oval or circular transition 118 as shown in FIG. 4A.

The geometries of longitudinal ridge 124 and cusp 125 also vary. For example, one or both of longitudinal ridge 124 and cusp 125 may be formed as long, narrow processes extending along the wall of cooling hole 104, either where the sloping surfaces of adjacent lobes 134 meet, or as a narrow raised band or rib structure between adjacent lobes 134. Longitudinal ridge 124 and cusp 125 may also form either substantially pointed or more rounded features along adjacent lobes 134, or where the direction of curvature reverses along surfaces 120, 122, 130 or 132 of cooling hole 104. Longitudinal ridge 124 and cusp 125 may also be formed as arched or cone-shape features between adjacent lobes 134.

Figure 5A:
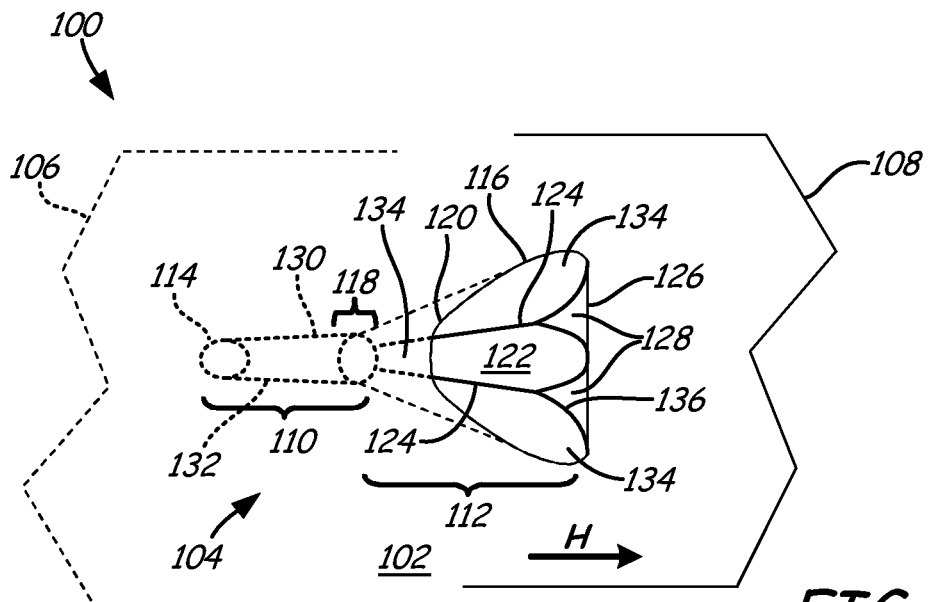
FIG. 5A is a schematic view of the gas path wall, illustrating a three-lobe cooling hole geometry in the outlet region.

FIG. 5A is a schematic view of gas path wall 102, illustrating a three lobe configuration for cooling hole 104 in diffusing section 112. In this configuration, two longitudinal ridges 124 extend from transition 118 toward outlet 116, dividing cooling hole 104 into three lobes 134 along diffusing section 112. In alternative embodiments, diffusing section 112 can include more than three lobes, such as four lobes, five lobes, or six lobes.

Two transition regions 128 extend from longitudinal ridges 124 to trailing edge 126 of outlet 116, between adjacent lobes 134. The mutual boundaries of transition regions 128 and adjacent lobes 134 are defined along arcuate extensions 136, as described above. Transition regions 128 extend across substantially all of trailing edge 126, eliminating cusps and other irregularities to provide more uniform flow coverage for better cooling performance along second surface 108 of gas path wall 102, downstream of outlet 116. Transition regions 128 can also eliminate sharp corners and reduce thermal mechanical fatigue.

Figure 5B:
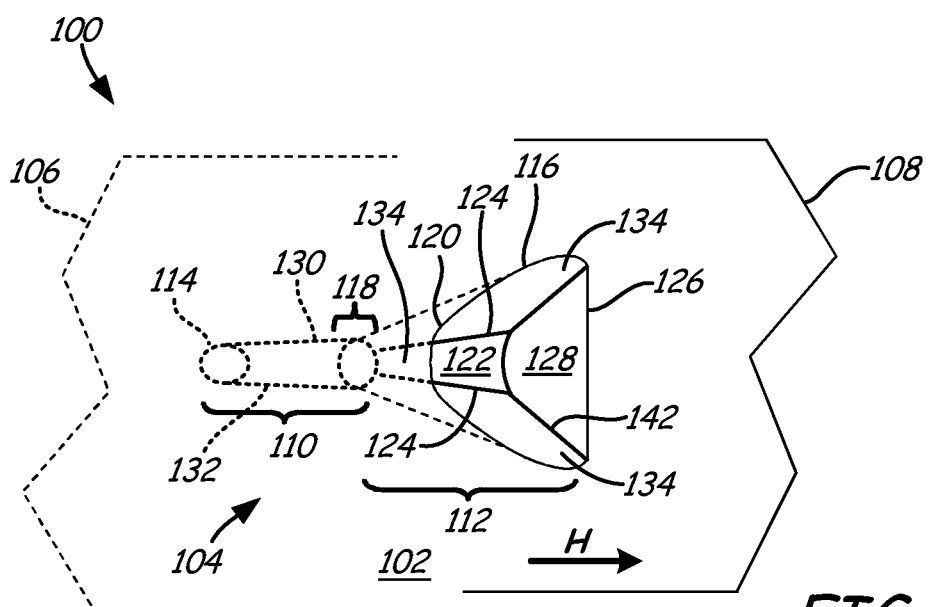
FIG. 5B is a schematic view of the gas path wall, illustrating a buried ridge cooling hole geometry in the outlet region.

FIG. 5B is a schematic view of gas turbine engine component 100 with gas path wall 102, illustrating a "flushed" divider or ridge configuration for diffusing section 112 of cooling hole 104. As shown in FIG. 5B, longitudinal ridges 124 extend from transition 118 toward outlet 116, dividing diffusing section 112 into two lobes 134 as described above. In this configuration, however, longitudinal ridge 124 is smoothed out and terminates at transition region 128, as bounded between intersections 142 along adjacent (outer) lobes 134.

Unlike arcuate extensions 136 of longitudinal ridges 124, intersections 142 do not extend above downstream surface 122 toward axis A of cooling hole 104. Instead, transition region 128 is defined along downstream surface 122, and adjacent lobes 134 curve up from intersections 142 toward second (upper) surface 108 of gas path wall 102. Transition region 128 extends across substantially all of trailing edge 126, as descried above, eliminating cusps and other irregularities for more uniform flow.

The overall geometry of cooling hole 104 thus varies, as described above, and as shown in the figures. The design of inlet 114 and outlet 116 may also vary, including various circular, oblate, oval, trapezoidal, triangular, cusped and delta shaped profiles with arcuate or piecewise linear upstream surfaces 120 and straight or convex trailing edges 126. The configuration of cooling hole 104 is not limited to these particular examples, moreover, but also encompasses different combinations of the various features that are shown, including metering section 110 with a variety of different cusps 125; transitions 118 with different circular, elliptical, oblong and cusped cross sections; and diffusing sections 112 with one, two or three lobes 134, in combination with different transition regions 128 bordered by various arcuate extensions 136 and intersections 142.

Figure 6:
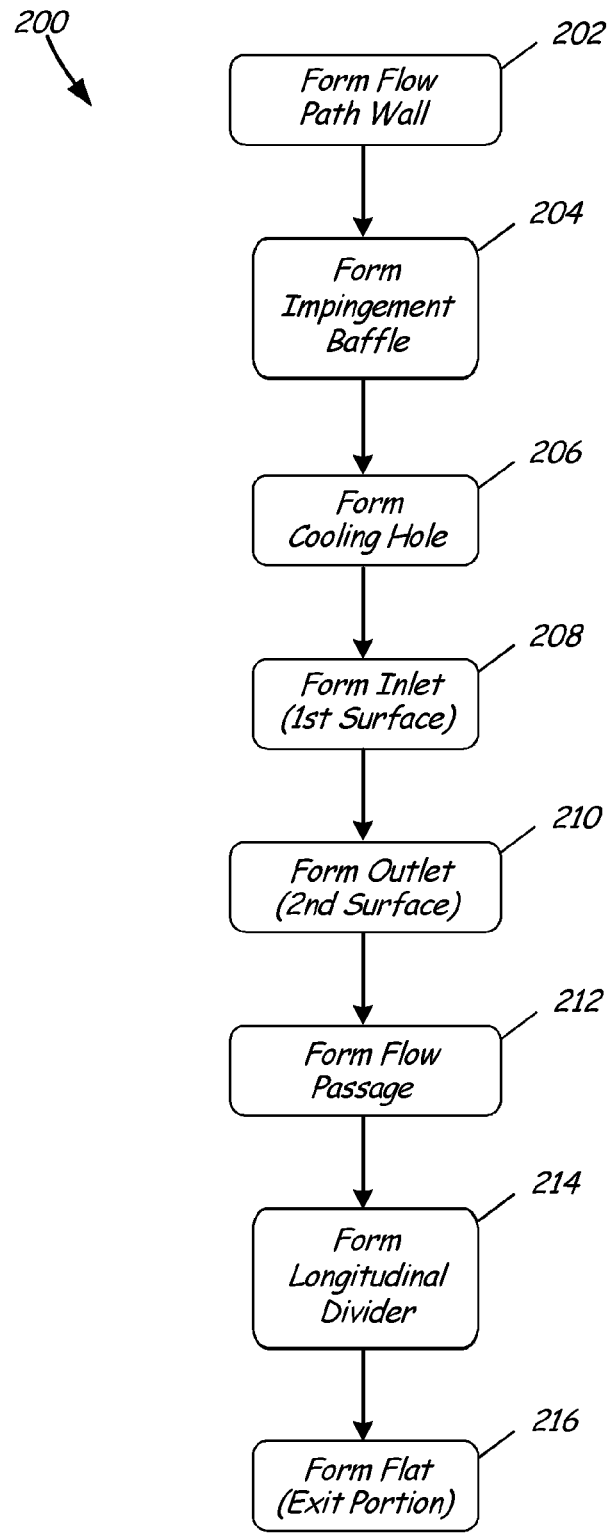
FIG. 6 is a block diagram of a method for forming a cooling hole in a gas turbine engine component.

FIG. 6 is a block diagram illustrating method 200 for forming an impingement and film (float wall) cooling assembly for a gas turbine engine component. For example, method 200 may be used to form cooling assembly 70 with impingement baffle 80 and gas path wall 102 for a combustor liner, turbine exhaust assembly, exhaust nozzle, augmentor or other gas turbine engine component 100, as described above. Alternatively, method 200 may be used to form cooling assembly 70 with cooling holes 104 configured as cooling holes 60 in rotor airfoil 22 or stator airfoil 24, as shown in FIGS. 2A and 2B, or in another airfoil component 100.

Method 200 includes forming a gas path wall (step 202) for the component, forming an impingement baffle (step 204) spaced from the gas path wall, and forming a cooling hole (step 206) in the gas path wall. For example, forming a cooling hole (step 206) may include forming an inlet in a first (e.g., cool) surface of the gas path wall (step 208), forming an outlet in a second (e.g., hot) surface of the gas path wall (step 210), and forming a cooling hole (step 212) between the inlet and the outlet.

The cooling hole (step 212) extends from the first surface of the gas path wall to the second surface. Forming the cooling hole (step 212) includes forming a metering section extending from the inlet along the cooling hole to a transition, and forming a diffusing section extending from the transition along the cooling hole to the outlet. The cross sectional flow area of the metering section is constant or deceasing from the inlet to the transition, in order to regulate the flow of cooling fluid through the cooling hole. The cross sectional flow area of the diffusing section increases from the transition to the outlet, in order to provide diffusive flow for improved cooling fluid coverage.

One or more longitudinal ridges (step 214) may be formed along the cooling hole to divide the diffusing section of the cooling hole into lobes. The longitudinal ridges are formed as rib, ridge or cusps, as described above, for example along a downstream wall of the cooling hole. The longitudinal ridges extend out from the wall toward the axis of the cooling hole, in order to discourage swirl and reduce losses at the outlet.

In some designs, a longitudinal ridge extends from the transition and along the metering section of the cooling hole to a cusp on the inlet. In other designs, a ridge extends along the metering section from a ridge terminus located between the inlet and the outlet, for example at the transition. In further designs, a transition region (step 216) extends from a longitudinal ridge to the trailing edge of the outlet.

The gas turbine engine components, gas path walls and cooling holes described herein can thus be manufactured using one or more of a variety of different processes. These techniques provide each cooling hole with its own particular configuration and features, including, but not limited to, inlet, metering, transition, diffusion, outlet, upstream surface, downstream surface, lateral surface, longitudinal, lobe and downstream edge features, as described above. In some cases, multiple techniques can be combined to improve overall cooling performance or reproducibility, or to reduce manufacturing costs.

Suitable manufacturing techniques for forming the cooling configurations described here include, but are not limited to, electrical discharge machining (EDM), laser drilling, laser machining, electrical chemical machining (ECM), water jet machining, casting, conventional machining and combinations thereof. Electrical discharge machining includes both machining using a shaped electrode as well as multiple pass methods using a hollow spindle or similar electrode component. Laser machining methods include, but are not limited to, material removal by ablation, trepanning and percussion laser machining. Conventional machining methods include, but are not limited to, milling, drilling and grinding.

The gas path walls and outer surfaces of some gas turbine engine components include one or more coatings, such as bond coats, thermal barrier coatings, abrasive coatings, abradable coatings and erosion or erosion-resistant coatings. For components having a coating, the inlet, metering section, transition, diffusing section and outlet cooling features may be formed prior to a coating application, after a first coating (e.g., a bond coat) is applied, or after a second or third (e.g., interlayer) coating process, or a final coating (e.g., environmental or thermal barrier) process. Depending on component type, cooling hole or passage location, repair requirements and other considerations, the diffusing section and outlet features may be located within a wall or substrate, within a thermal barrier coating or other coating layer applied to a wall or substrate, or combinations thereof. The cooling geometry and other features may remain as described above, regardless of position relative to the wall and coating materials or airfoil materials.

In addition, the order in which cooling features are formed and coatings are applied may affect selection of manufacturing techniques, including techniques used in forming the inlet, metering section, transition, outlet, diffusing section and other cooling features. For example, when a thermal barrier coat or other coating is applied to the outer surface of a gas path wall before the cooling hole is produced, laser ablation or laser drilling may be used. Alternatively, either laser drilling or water jet machining may be used on a surface without a thermal barrier coat. Additionally, different machining methods may be more or less suitable for forming different features of the cooling hole, for example, different EDM, laser machining and other machining techniques may be used for forming the outlet and diffusion features, and for forming the transition, metering and inlet features.

While the invention is described with reference to exemplary embodiments, it will be understood by those skilled in the art that various changes may be made and equivalents may be substituted without departing from the spirit and scope of the invention. In addition, different modifications may be made to adapt the teachings of the invention to particular situations or materials, without departing from the essential scope thereof. The invention is thus not limited to the particular examples disclosed herein, but includes all embodiments falling within the scope of the appended claims.

Discussion of Possible Embodiments

The following are non-exclusive descriptions of possible embodiments of the present invention.

A gas turbine engine component can include a gas path wall having a first and second opposing surfaces and a baffle positioned along the gas path wall. The baffle can have impingement holes for directing cooling fluid onto the first surface of the gas path wall. A cooling hole can be formed in the gas path wall and extends from a metering section having an inlet in the first surface through a transition to a diffusing section having an outlet in the second surface. A longitudinal ridge can extend along the cooling hole between the transition and the outlet. The longitudinal ridge can divide the diffusing section of the cooling hole into first and second lobes.

The component of the preceding paragraph can optionally include, additionally and/or alternatively any, one or more of the following features, configurations and/or additional components:

the longitudinal ridge can be a first longitudinal ridge, the component can further include a second longitudinal ridge and a third lobe; and the first and second longitudinal ridges can divide the cooling hole into the first, second, and third lobes;

the longitudinal ridge can extend through the transition and along the metering section of the cooling hole to a cusp on the inlet;

the outlet can have an arcuate upstream wall extending downstream to a substantially straight trailing edge;

the cooling hole can be one of a plurality of cooling holes and each of the impingement holes can be paired with and positioned upstream of one of the cooling holes;

the impingement holes can be are substantially cylindrical;

bumps can extend from the first surface toward the baffle and be substantially aligned with the impingement holes;

the bumps can have a convex surface with a relatively steep slope in a longitudinally upstream direction and a relatively gradual slope in a longitudinally downstream direction;

a transition region can extend from the longitudinal ridge to a trailing edge of the outlet, and the longitudinal ridge can terminate at the transition region; and/or a combustor assembly can include the component.

A liner assembly for a gas turbine engine can include an impingement baffle having impingement holes and a liner wall having a first surface extending along the impingement baffle and a second surface extending opposite the first surface. A cooling hole can be formed in the liner wall. The cooling hole can include a metering section having an inlet in the first surface, a diffusing section having an outlet in the second surface, and a transition between the metering section and the diffusing section. A longitudinal ridge can extend between the transition and the outlet. The longitudinal ridge can divide the diffusing section of the cooling hole into first and second lobes.

The liner assembly of the preceding paragraph can optionally include, additionally and/or alternatively any, one or more of the following features, configurations and/or additional components:

cross sectional area of the cooling hole can not increase from the inlet through the metering section to the transition;

cross sectional area of the cooling hole can increase from the transition through the diffusing section to the outlet.

the longitudinal ridge can be a first longitudinal ridge, the cooling hole can include a second longitudinal ridge and a third lobe, and the first and second longitudinal ridges can divide the cooling hole into the first, second, and third lobes;

the longitudinal ridge can extend through the transition and along the metering section of the cooling hole to a cusp on the inlet;

the cooling hole can be one of a plurality of cooling holes and each of the impingement holes can be paired with and positioned upstream of one of the cooling holes;

the impingement holes can be substantially elongated slots;

bumps can extend from the first surface toward the impingement baffle and be substantially aligned with the impingement holes;

the bumps can have a convex surface with a relatively steep slope in a longitudinally upstream direction and a relatively gradual slope in a longitudinally downstream direction; and/or a gas turbine engine component can include the liner assembly.

The invention claimed is:

1. A gas turbine engine component comprising:
    a gas path wall having a first and second opposing surfaces and defining a cooling hole, the cooling hole extending from a metering section having an inlet in the first surface through a transition to a diffusing section having an outlet in the second surface;
    a baffle positioned along the gas path wall, the baffle having impingement holes for directing cooling fluid onto the first surface of the gas path wall;
    a first longitudinal ridge extending along the cooling hole between the transition and the outlet; and
    a second longitudinal ridge, wherein the first and second longitudinal ridges divide the cooling hole into first, second, and third lobes.

2. The component of claim 1, wherein the outlet has an arcuate upstream wall extending downstream to a substantially straight trailing edge.

3. The component of claim 1, wherein the cooling hole is one of a plurality of cooling holes and wherein each of the impingement holes are paired with and positioned upstream of one of the cooling holes.

4. The component of claim 1, wherein the impingement holes are substantially cylindrical.

5. The component of claim 1, and further comprising:
    bumps extending from the first surface toward the baffle and substantially aligned with the impingement holes.

6. The component of claim 5, wherein the bumps have a convex surface with a relatively steep slope in a longitudinally upstream direction and a relatively gradual slope in a longitudinally downstream direction.

7. The component of claim 1, and further comprising:
    a transition region extending from the longitudinal ridge to a trailing edge of the outlet, wherein the longitudinal ridge terminates at the transition region.

8. A combustor assembly comprising the component of claim 1.

9. A gas turbine engine component comprising:
a gas path wall having a first and second opposing surfaces and defining a cooling hole, the cooling hole extending from a metering section having an inlet in the first surface through a transition to a diffusing section having an outlet in the second surface;
a baffle positioned along the gas path wall, the baffle having impingement holes for directing cooling fluid onto the first surface of the gas path wall;
a longitudinal ridge extending along the cooling hole from the transition to the outlet, the longitudinal ridge dividing the diffusing section of the cooling hole into first and second lobes; and
a cusp on the inlet, wherein the longitudinal ridge extends through the transition and along the metering section of the cooling hole to the cusp.

10. The component of claim 9, wherein the outlet has an arcuate upstream wall extending downstream to a substantially straight trailing edge.

11. The component of claim 9, wherein the impingement holes are substantially cylindrical.

12. A liner assembly for a gas turbine engine, the liner assembly comprising:
an impingement baffle having impingement holes;
a liner wall having a first surface extending along the impingement baffle and a second surface extending opposite the first surface and defining a cooling hole, the cooling hole extending from a metering section having an inlet in the first surface through a transition to a diffusing section having an outlet in the second surface;
a first longitudinal ridge extending between the transition and the outlet; and
a second longitudinal ridge, wherein the first and second longitudinal ridges divide the cooling hole into the first, second, and third lobes.

13. The liner assembly of claim 12, wherein cross sectional area of the cooling hole does not increase from the inlet through the metering section to the transition.

14. The liner assembly of claim 13, wherein cross sectional area of the cooling hole increases from the transition through the diffusing section to the outlet.

15. The liner assembly of claim 12, wherein the cooling hole is one of a plurality of cooling holes and wherein each of the impingement holes are paired with and positioned upstream of one of the cooling holes.

16. The liner assembly of claim 12, wherein the impingement holes are substantially elongated slots.

17. The liner assembly of claim 12, and further comprising:
bumps extending from the first surface toward the impingement baffle and substantially aligned with the impingement holes.

18. The liner assembly of claim 17, wherein the bumps have a convex surface with a relatively steep slope in a longitudinally upstream direction and a relatively gradual slope in a longitudinally downstream direction.

19. A gas turbine engine component comprising the liner assembly of claim 12.

20. A liner assembly for a gas turbine engine comprising:
an impingement baffle having impingement holes;
a liner wall having a first surface extending along the impingement baffle and a second surface extending opposite the first surface and defining a cooling hole, the cooling hole extending from a metering section having an inlet in the first surface through a transition to a diffusing section having an outlet in the second surface;
a longitudinal ridge extending from the transition to the outlet, wherein the longitudinal ridge divides the diffusing section of the cooling hole into first and second lobes; and
a cusp on the inlet, wherein the longitudinal ridge extends through the transition and along the metering section of the cooling hole to the cusp.

* * * * *